(12) United States Patent
Golinelli

(10) Patent No.: US 6,760,980 B1
(45) Date of Patent: Jul. 13, 2004

(54) AXIAL MOVEMENT LINEAR GAUGING HEAD

(75) Inventor: Guido Golinelli, Bologna (IT)

(73) Assignee: Marposs Societa per Azioni, Bentivoglio (IT)

( * ) Notice: Subject to any disclaimer, the term of this patent is extended or adjusted under 35 U.S.C. 154(b) by 0 days.

(21) Appl. No.: 10/129,791

(22) PCT Filed: Nov. 16, 2000

(86) PCT No.: PCT/EP00/11350
§ 371 (c)(1),
(2), (4) Date: May 10, 2002

(87) PCT Pub. No.: WO01/38819
PCT Pub. Date: May 31, 2001

(30) Foreign Application Priority Data

Nov. 26, 1999 (IT) .......................... BO99A0645

(51) Int. Cl.[7] ................................. G01B 5/00
(52) U.S. Cl. ........................................ 33/832; 33/556
(58) Field of Search .......................... 33/832, 833, 706, 33/707, 708, 556, 558, 559, 561; 384/43, 44

(56) References Cited

U.S. PATENT DOCUMENTS

| | | | | |
|---|---|---|---|---|
| 3,047,956 A | * | 8/1962 | German ....................... | 33/535 |
| 3,193,937 A | * | 7/1965 | Alter ........................... | 33/558 |
| 3,213,360 A | * | 10/1965 | Cook et al. ................. | 324/662 |
| 3,888,012 A | * | 6/1975 | Droz ............................ | 33/557 |
| 4,347,492 A | * | 8/1982 | Davis et al. ................. | 336/136 |
| 4,573,272 A | | 3/1986 | Golinelli et al. | |
| 4,772,849 A | * | 9/1988 | Tedder ........................ | 324/220 |
| 5,072,524 A | * | 12/1991 | Zanier et al. ................. | 33/558 |
| 5,207,005 A | * | 5/1993 | Amos et al. ............. | 33/501.04 |
| 5,321,895 A | * | 6/1994 | Dubois-Dunilac et al. .... | 33/556 |
| 5,414,940 A | * | 5/1995 | Sturdevant ................... | 33/559 |
| 5,584,765 A | | 12/1996 | Ochiai | |
| 5,779,367 A | | 7/1998 | Obara | |
| 6,087,919 A | * | 7/2000 | Golinelli ..................... | 336/136 |
| 6,510,614 B1 | * | 1/2003 | Kato et al. ................... | 33/1 M |
| 6,516,534 B2 | * | 2/2003 | Chen et al. .................. | 33/706 |

FOREIGN PATENT DOCUMENTS

WO    WO 97/46849    12/1997    .......... G01B/7/012

* cited by examiner

Primary Examiner—Diego Gutierrez
Assistant Examiner—R. Alexander Smith
(74) Attorney, Agent, or Firm—Dickstein Shapiro Morin & Oshinsky LLP

(57) ABSTRACT

A linear gauging head, for example a "cartridge" head, includes a casing (1), a spindle (11), movable with respect to the casing along a longitudinal axis, a feeler (13') coupled to a first end of the spindle, and a differential position transducer with windings (15, 16, 17), stationary with respect to the casing, and a core (18) coupled to a second end of the spindle. The spindle includes longitudinal grooves (12) and is guided by means of an axial bearing (22) with rolling elements (23) that cooperate with the grooves for allowing the spindle to translate with respect to the casing along the longitudinal axis, and concurrently prevent it from rotating about said axis.

17 Claims, 2 Drawing Sheets ly related to a linear gauging head,
including support and protection means with a casing,
defining a longitudinal geometrical axis, an elongate
element, axially movable with respect to the support and
protection means, thrust means arranged between the support and protection means and the elongate element to apply
a substantially axial thrust to the elongate element, guide
means, for guiding axial displacements of the elongate
element with respect to the casing, including at least an axial
bearing arranged within the casing and including a plurality
of rolling elements cooperating with the elongate element,
and a position transducer for detecting displacements of the
elongate element with respect to the support and protection
means.

AXIAL MOVEMENT LINEAR GAUGING HEAD

TECHNICAL FIELD

The present invention relates to a linear gauging head, including support and protection means with a casing, defining a longitudinal geometrical axis, an elongate element, axially movable with respect to the support and protection means, thrust means arranged between the support and protection means and the elongate element to apply a substantially axial thrust to the elongate element, guide means, for guiding axial displacements of the elongate element with respect to the casing, including at least an axial bearing arranged within the casing and including a plurality of rolling elements cooperating with the elongate element, and a position transducer for detecting displacements of the elongate element with respect to the support and protection means.

BACKGROUND ART

Axial movement linear gauges, or gauging heads, that have similar characteristics are known, for example, from International patent application No. WO-A-97/46849. In such patent application, there is disclosed a head with the typical structure of the so-called "cartridge" heads, including a cylindrical spindle, axially sliding within a casing by means of a guide device consisting of two axial bearings, housed in the casing in longitudinally spaced out positions, each including through holes in which there is partially inserted the spindle. The spindle carries at one end a feeler for contacting the piece to be checked and at the other end a ferromagnetic core that translates inside associated windings as a consequence of axial displacements of the spindle. Each axial bearing includes closed tracks in which rows of appropriately shaped elements, as balls, can roll. The tracks include longitudinal portions formed at positions corresponding to the slits located on the internal surface of the bearing along which the balls contact the spindle and enable its axial sliding with respect to the casing. In said cartridge head, for the purpose of preventing axial rotations of the spindle with respect to the casing, there is a pin radially fixed to the spindle and carrying—at its free end—an idle wheel housed in an axial slit integral with the casing, for example achieved in a spacer element located between the two bearings.

In these linear gauges, the unavoidable clearance existing between slit and idle wheel may affect the accuracy and the repeatability, especially in those cases when there is the need to utilize a feeler offset with respect to the longitudinal axis of the gauge. In fact, in similar cases slight rotations of the spindle about its axis, due to clearance existing between slit and idle wheel, may cause considerable rotations of the feeler, and negatively affect the accuracy and repeatability of the checkings performed by the linear gauge.

Furthermore, an antirotation device as the one disclosed in WO-A-97/46849 necessitates suitable precision, mechanical machinings to be carried out on the spindle for the insertion of the pin with the idle wheel, and on the spacer element for achieving the slit, hence this implies additional expenses and considerable assembly time. Other known linear gauges can include other types of guide and sliding means for the movable spindle, for example bushings with cages with holes for seating the balls. Linear gauges of this type are disclosed, for example, in U.S. Pat. No. 4,347,492. In each of the two embodiments disclosed in the U.S. patent too, the axial rotations of the spindle are limited by a device, similar the one previously briefly described, that includes a pin radially coupled to the spindle and partially housed—with limited but unavoidable clearance—in an axial slit formed in the casing.

U.S. Pat. No. 5,779,367 discloses spline bearings assemblies with shafts featuring track grooves and relevant outer cylinders housing rolling elements that partially protrude and are arranged in the track grooves to guide movements of the shafts. The spline bearings include additional grooves housing linear scales with magnetic poles, and one or more magnetic sensors are fixed to each outer cylinder, e.g. housed in further grooves of the latter. U.S. Pat. No. 5,779,367 does not refer to a linear gauging head for dimensional checkings, but to complex and costly bearing assemblies, e.g. for small carriages, allowing to control the position of the carriages.

DISCLOSURE OF THE INVENTION

Object of the present invention is to provide a linear gauging head that guarantees high standards of accuracy, repeatability and reliability, enables—with respect to the known structures—a reduction of costs and time required for the assembly of the various component parts and offers a particularly simple structure.

This and other objects are achieved by a linear gauging head according to claim 1.

One of the main advantages provided by the herein illustrated and described linear gauging head consists in its specific compactness, achieved also thanks to the reduction of the number of component parts.

Another important advantage, offered by the substantial elimination of clearance in the limitation of the axial rotation of the spindle, consists in the possibility of utilizing simple and inexpensive linear gauging heads according to the invention in applications wherein the feeler is offset with respect to the spindle sliding axis and there are required a high degree of accuracy and repeatability.

BRIEF DESCRIPTION OF THE DRAWINGS

A preferred embodiment of a linear gauging head according to the invention is now described with reference to the enclosed sheets of drawings, given by way of non limiting example, wherein.

BEST MODE FOR CARRYING OUT THE INVENTION

Figure 1:
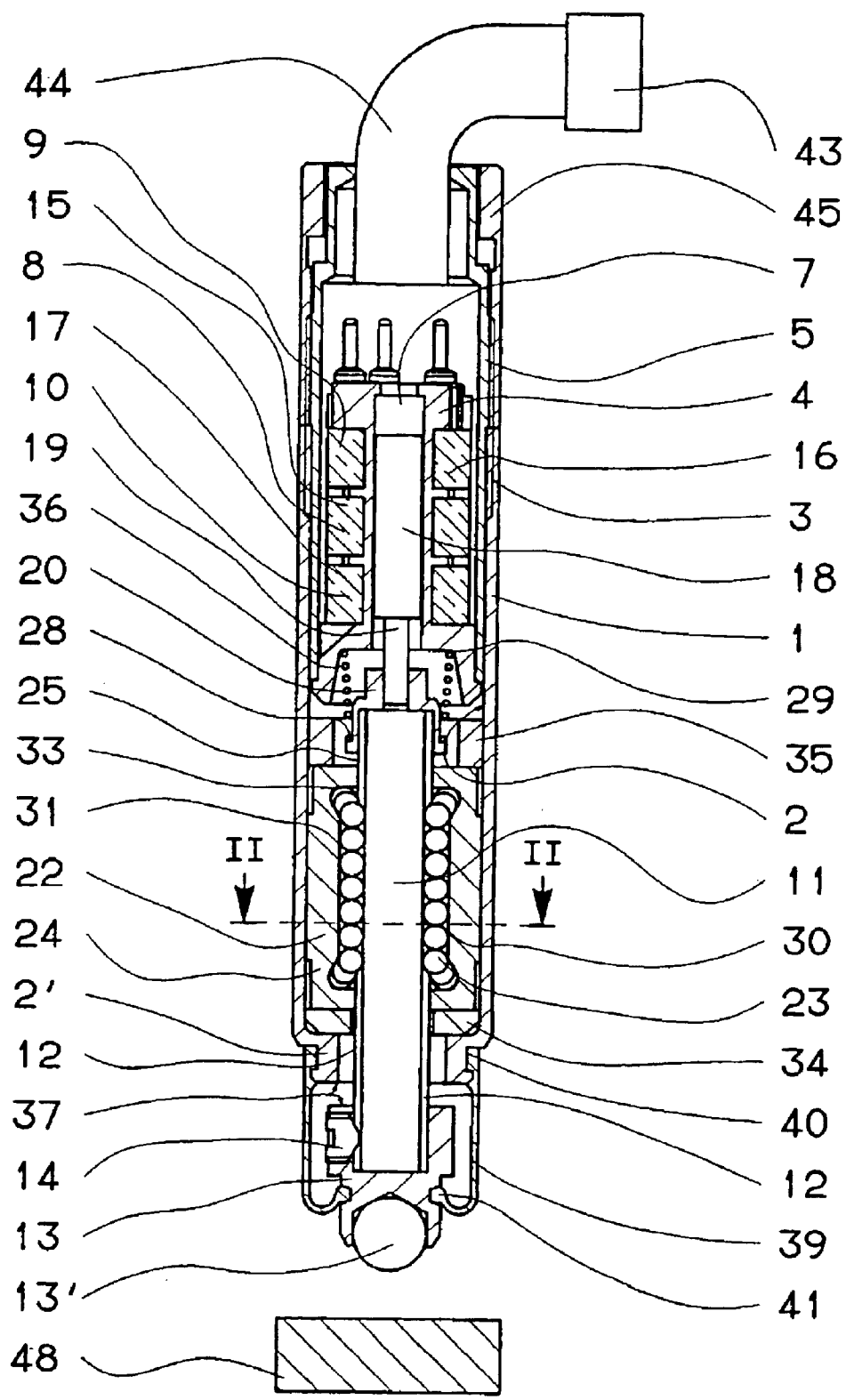
FIG. 1 is a longitudinal cross-sectional view of a gauging head according to an embodiment of the invention.
Figure 2:
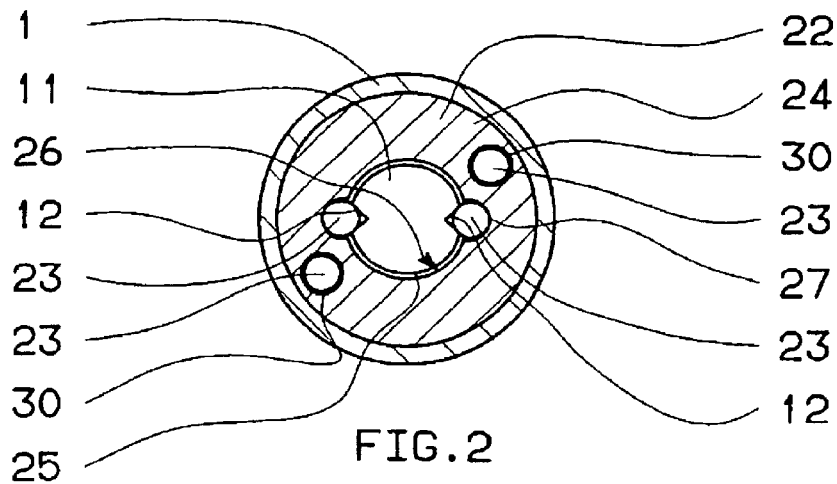
FIG. 2 is an enlarged scale cross-sectional view of the gauging head shown in FIG. 1, taken along line II—II in FIG. 1.

The axial movement gauging head shown in FIG. 1 comprises support and protection means with a tubular casing 1, e.g. made of steel and having a substantially cylindrical shape, that defines a longitudinal geometrical axis and a substantially cylindrical internal surface 2, and includes a limiting annular projection 2' and a threaded end portion 3. A spool 4 is housed in casing 1 and defines a longitudinal opening 7 and three external annular seats 8, 9 and 10.

An elongate element, or spindle, 11 with two longitudinal grooves 12, oppositely arranged and with V-shaped cross-section, is inserted in and movable with respect to casing 1. A support element 13 for a feeler 13', for contacting a piece to be checked 48, is coupled to spindle 11, by means of a dowel 14 coupled by friction to one of the two longitudinal grooves 12.

An inductive differential position transducer comprises a primary winding 15, two secondary windings 16 and 17 and a core 18 made of ferromagnetic material. The windings 15, 16 and 17 are tightly wound—according to a known technique—about spool 4 at the annular seats 8, 9 and 10, respectively, whereas core 18 is fixed (for example, glued) to a stem 19 that is coupled, by means of a support 20, to spindle 11 at the opposite end with respect to the one carrying the feeler element 13'. The coupling between stem 19, support 20 and spindle 11 may foresee, for example, the use of glues.

Spool 4 with associated windings 15, 16 and 17 is housed in and coupled to a liner 5, i.e. windings 15, 16 and 17 are glued to the former liner 5. The external surface of liner 5 has a threaded portion screwed into the threaded end portion 3 of casing 1.

Guide means, for guiding axial displacements of spindle 11 with respect to casing 1, comprise an axial bearing 22 with recirculating balls, per se known, housed in casing 1 and including rolling elements, namely balls 23, that contact surfaces defined by the longitudinal grooves 12. As illustrated in the figures, this axial bearing 22 has a hollow support element 24 with a substantially cylindrical shape and a longitudinal through hole 25 for the partial insertion of spindle 11. Through hole 25 defines a cylindrical surface 26 of support element 24 with longitudinal slits 27. The hollow support element 24 defines internal circulation tracks 30 where balls 23 are seated. Each track 30 has a first longitudinal portion 31, a second longitudinal portion not illustrated in the drawings, substantially reciprocally parallel, and connecting portions 33 between these longitudinal portions. The slits 27, located on cylindrical surface 26, are arranged on the first longitudinal portion 31 of each internal circulation track 30 and have specific dimensions so as to withhold the balls 23 within the associated rolling track 30 and enable such balls 23 to partially protrude with respect to the cylindrical surface 26 and contact the surface of spindle 11 when they are in the associated first longitudinal portion 31.

The aforementioned International patent application No. WO-A-97/46849 provides a broader description of a cartridge head including identical axial bearings with recirculating rolling balls.

As illustrated in the figures, balls 23 contact the surface of spindle 11 at points of the walls of the V-shaped grooves 12. In this way, the coupling between spindle 11 and the axial bearing 22 enables spindle 11 to axially translate with respect to casing 1, and, at the same time, prevents it from rotating about its axis.

In practice, the means for guiding spindle 11 also achieve the so-called "antirotation" function for spindle 11.

Elements for the longitudinal positioning comprise a first spacer element 34 and a second spacer element 35 housed in casing 1 and arranged, respectively, between the limiting annular projection 2' of casing 1 and the support element 24 of bearing 22, and between the support element 24 of bearing 22 and spool 4.

Thrust means comprise a compression spring 36, with its ends housed, respectively, in a seat 28 of support 20 for stem 19 and in a seat 29 of spool 4, that enables to hold spindle 11—when there is no contact between feeler 13' and piece 48 to be checked—in a position defined by the abutment between surfaces of support 20 and those of the hollow support element 24.

Abutment surfaces 37 of support 13 for feeler 13' and of casing 1 cooperate for defining the stroke limit of spindle 11, when feeler 13' contacts piece 48, travelling against the bias of spring 36.

A flexible, tubular-shaped sealing gasket 39 has one of its ends coupled to a seat 40 defined in tubular casing 1 and the other end coupled to a seat 41 defined in support 13 for feeler 13'.

The electric connection between the windings 15, 16 and 17 of the differential transducer and external power supply, display and processing devices (schematically shown and identified by reference number 43 in FIG. 1) occurs by means of the wires of a cable 44.

Elements for the longitudinal clamping comprise a threaded clamping ring nut 45 that, by coupling with the threaded portion of liner 5, locks the mutual position of casing 1 with respect to liner 5 and thus defines the mutual arrangement between core 18 and the transducer windings 15, 16 and 17.

The assembly of the various component parts of the described and illustrated gauging head is performed in a particularly simple and rapid way. First, the first spacer element 34, bearing 22 and the second spacer element 35 are inserted in sequence in casing 1, and glued thereto. Then there is the insertion of spindle 11, including the previously coupled thereto support 20 with stem 19 and core 18. Feeler 13' is coupled, by means of dowel 14, to spindle 11 and subsequently there is assembled gasket 39. Then there is the insertion of spring 36 and to follow liner 5—to which there is coupled spool 4 with windings 15, 16 and 17—is screwed to casing 1. The mutual arrangement between casing 1 and liner 5 is thereafter locked by the threaded ring nut 45.

When the gauging head is in normal operating conditions and there is no contact occurring between feeler 13' and piece 48, as illustrated in FIG. 1, spring 36 urges spindle 11 to a rest position defined by the cooperation between the abutment surfaces of support 20 for stem 19 and of the hollow element 24 of bearing 22. When contact occurs (in any whatever manual or automatic known way, herein neither illustrated nor described) between feeler 13' and a surface of piece 48, spindle 11 displaces, with respect to casing 1 and in opposition to the action of spring 36, guided by bearing 22, along a rectilinear path parallel to the longitudinal axis of casing 1.

More specifically, balls 23 contact—through slits 27—the surfaces of spindle 11 defined by grooves 12 and roll at one side on them and at the other on internal surfaces of tracks 30, due to the thrust that spindle 11 undergoes. The displacement of spindle 11 causes core 18 to displace within windings 15, 16 and 17 and a corresponding output voltage variation at the terminals of the secondary windings 16 and 17, according to the known functioning principle of an inductive differential transducer. By means of the electric connection comprising the wires of cable 44, the voltage variation with respect to a zero condition (defined in a known way in a previous zero-setting phase of the head) is detected in the external devices 43 and the data relating to the amount of displacement from the rest position is displayed.

An axial movement gauging head as the herein described and illustrated one offers specific characteristics insofar as reliability, simplicity and economic convenience are concerned.

An axial bearing 22, coupled to a spindle 11 including the two longitudinal grooves 12, enables to achieve guide and antirotation means for allowing spindle 11 to accomplish translation displacements with respect to casing 1 and at the same time, without adding any further elements, prevent axial rotations, substantially without any clearance, of spindle 11 with respect to casing 1. This provides considerable advantages to the gauging head.

Firstly, the absence of clearance permits extremely accurate translation displacements between spindle 11 and casing 1. In this way, the use of feelers offset with respect to the longitudinal axis of the gauging head is not a problem, as in the known gauging heads, because the risk of errors due to axial rotation displacements—even if of a minimum entity—between spindle 11 and casing 1 and that can cause considerable displacements of feeler 13', is substantially eliminated.

Furthermore, the absence of antirotation means separated from the guide means simplifies the design, and consequently provides savings in terms of manufacturing costs and assembly time.

There are linear gauging heads that fall within the scope of this invention achieved according to embodiments that differ under some aspects from what has been herein schematically illustrated and so far described. Some of the possible variants are hereinafter briefly described.

The axial bearing 22 can include rolling elements other than balls 23, as, for example, cylindrical rollers or rollers of another shape.

The axial bearing 22' (FIG. 3) can include a different number of tracks with respect to the number (two) shown in the figures. In this case, some of the tracks have portions facing the grooves 12 of spindle 11, and the associated balls 23 achieve the guide and the antirotation functions as herein previously disclosed, while other balls, in associated tracks, have smaller dimensions, and contact the cylindrical surface of spindle 11 for the purpose of accomplishing known guide functions.

Figures 3, 4:
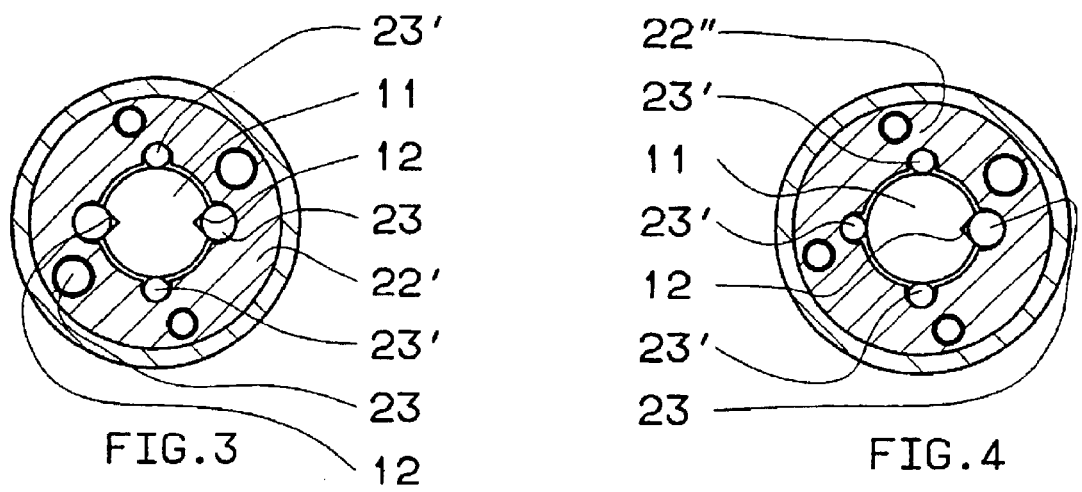
FIGS. 3, 4, 5 are cross-sectional views of gauging heads according to three different embodiments of the invention.

Spindle 11 can have a single longitudinal groove 12 (FIG. 4). Only one of the tracks of bearing 22" includes balls 23, of suitable dimensions, for achieving the antirotation function, while the balls 23' of the other track (or tracks) have just known guide functions.

Spindle 11 can have three or more longitudinal grooves 12, and the bearing 22 can have tracks and balls appropriate in number and dimensions.

There can be foreseen two or more axial bearings 22, at least one including balls 23 that cooperate with the groove(s) 12 of spindle 11.

Figure 5:
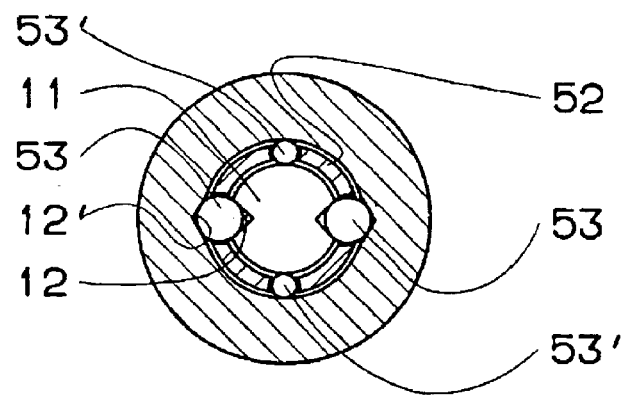

The axial bearing 22 with recirculating rolling balls can be replaced with one or more ball bushings 52 as those disclosed in U.S. Pat. No. 4,347,492 mentioned in the background art portion of this description (FIG. 5). In this case, some balls 53 with an antirotation function in addition to a guide function have larger dimensions with respect to the others 53', and roll, at one side on groove(s) 12 of spindle 11, and at the other on grooves 12' achieved in the internal casing surface, similar to grooves 12 of spindle 11 and facing them.

The thrust means can be achieved in a way that differs from that of utilizing spring 36, for example by means of pneumatic devices of a known type coupled to the support and protection means and adapted for applying a thrust to spindle 11.

The transducer can differ from the illustrated one and include a gauging head of a known type, for example a dial gauge, coupled to the support and protection means and comprising a movable part in contact with spindle 11. Furthermore, thanks to the specific mechanic structure according to the invention, it is possible to utilize even transducers that require extremely repeatable displacements between spindle 11 and casing 1, as, for example, incremental transducers, thereby achieving extremely high precision gauging heads or absolute gauges.

A gauging head according to the invention can be utilized in known checking devices, for example of the fork or plug type for checking, respectively, the external and internal diameter dimensions, in which there are foreseen an axially movable elongate element and transducer means for detecting its displacement.

What is claimed is:

1. A linear gauging head comprising:

support and protection means with a casing, defining a longitudinal geometrical axis;

a movable elongate element, axially movable with respect to the support and protection means;

thrust means arranged between the support and protection means and the movable elongate element to apply a substantially axial thrust to the movable elongate element;

guide means, for guiding axial displacements of the movable elongate element with respect to the casing, including at least one axial bearing arranged within the casing and including a plurality of rolling elements cooperating with the movable elongate element; and a position transducer for detecting the displacements of the movable elongate element with respect to the support and protection means, wherein the movable elongate element has a substantially cylindrical shape with at least one longitudinal groove, at least a portion of said rolling elements being adapted for cooperating with the movable elongate element at said at least one longitudinal groove.

2. The gauging head according to claim 1, wherein said at least one longitudinal groove has a V-shaped cross-section.

3. The gauging head according to claim 2, further comprising an additional longitudinal groove formed in the movable elongate element, said at least one longitudinal groove and said additional longitudinal groove being arranged at diametrically opposed positions.

4. The gauging head according to claim 3, further comprising a feeler element and an associated feeler support coupled to an end of the movable elongate element by means of a dowel coupled by friction to said at least one longitudinal groove.

5. The gauging head according to claim 4, wherein said position transducer is an inductive differential position transducer, the position transducer having windings connected to the casing and a magnetic core connected to the movable elongate element.

6. The gauging head according to claim 3, wherein said position transducer is an inductive differential position transducer, the position transducer having windings connected to the casing and a magnetic core connected to the movable elongate element.

7. The gauging head according to claim 1, wherein said position transducer is an inductive differential position transducer, the position transducer having windings connected to the casing and a magnetic core connected to the movable elongate element.

8. A linear gauging head comprising
   support and protection means with a casing, defining a longitudinal geometrical axis;
   a substantially cylindrical elongate element, axially movable with respect to the support and protection means and defining two longitudinal V-shaped grooves;
   thrust means arranged between the support and protection means and the elongate element to apply a substantially axial thrust to the elongate element;
   a position transducer for detecting the displacements of the elongate element with respect to the support and protection means; and
   at least one axial bearing arranged within the casing for guiding axial displacements of the elongate element with respect to the casing, said at least one axial bearing including:
   a hollow support element, with a substantially cylindrical shape and a longitudinal through hole, the through hole housing a portion of the elongate element and defining a cylindrical surface of the support element; and
   a plurality of rolling spherical elements housed in the hollow support element and cooperating with the elongate element at said two longitudinal grooves,
   said cylindrical surface including longitudinal slits adapted for holding the spherical rolling elements in the hollow support element and enabling the spherical rolling elements to partially protrude with respect to said cylindrical surface to contact the elongate element, at least one of said longitudinal slits facing one of said two longitudinal grooves.

9. The gauging head according to claim 8, wherein said hollow support element defines internal circulation tracks for the spherical rolling elements, said tracks including a first and a second longitudinal portions substantially reciprocally parallel, and two connecting portions between the longitudinal portions, said longitudinal slits being arranged on the first longitudinal portion of each internal circulation track.

10. The gauging head according to claim 9, further comprising a feeler element and an associated feeler support coupled to an end of the elongate element by means of a dowel coupled by friction to one of said two longitudinal grooves.

11. The gauging head according to claim 10, wherein said position transducer is an inductive differential position transducer, the position transducer having windings connected to the casing and a magnetic core connected to the elongate element.

12. The gauging head according to claim 9, wherein said position transducer is an inductive differential position transducer, the position transducer having windings connected to the casing and a magnetic core connected to the elongate element.

13. The gauging head according to claim 8, further comprising a feeler element and an associated feeler support coupled to an end of the elongate element by means of a dowel coupled by friction to one of said two longitudinal grooves.

14. The gauging head according to claim 13, wherein said position transducer is an inductive differential position transducer, the position transducer having windings connected to the casing and a magnetic core connected to the elongate element.

15. The gauging head according to claim 8, wherein said position transducer is an inductive differential position transducer, the position transducer having windings connected to the casing and a magnetic core connected to the elongate element.

16. A linear gauging head comprising
   support and protection means with a casing defining a longitudinal geometrical axis;
   an elongate element, axially movable with respect to the support and protection means, the elongate element having a substantially cylindrical shape with at least one longitudinal groove;
   thrust means arranged between the support and protection means and the elongate element to apply a substantially axial thrust to the elongate element;
   a position transducer for detecting the displacements of the elongate element with respect to the support and protection means; and
   guide means, for guiding axial displacements of the elongate element with respect to the casing, including at least one axial bearing arranged within the casing and including a plurality of rolling elements cooperating with the elongate element, said rolling elements being adapted for cooperating with the elongate element at said at least one longitudinal groove,
   the gauging head further comprising a feeler element and an associated feeler support coupled to an end of the elongate element by means of a dowel coupled by friction to said at least one longitudinal groove.

17. The gauging head according to claim 16, wherein said position transducer is an inductive differential position transducer, the position transducer having windings connected to the casing and a magnetic core connected to the elongate element.

* * * * *

UNITED STATES PATENT AND TRADEMARK OFFICE
CERTIFICATE OF CORRECTION

PATENT NO. : 6,760,980 B1
DATED : July 13, 2004
INVENTOR(S) : Guido Golinelli

It is certified that error appears in the above-identified patent and that said Letters Patent is hereby corrected as shown below:

Title page,
Item [73], Assignee, "Marposs Societa per Azioni" should read -- Marposs Società per Azioni --.
Item [56], References Cited, U.S. PATENT DOCUMENTS, "3,193,937 A * 7/1965 Alter" should read -- 3,193,937 A * 7/1965 Aller --.
-- 2,833,046 * 5/1958 Jeglum -- should be added.
-- 851,728 * 4/1907 Bayrer -- should be added.

Signed and Sealed this

Eighth Day of February, 2005

JON W. DUDAS
*Director of the United States Patent and Trademark Office*